Sept. 10, 1968    H. HUX ET AL    3,400,711
SURGICAL BONE PLATING APPLIANCE
Filed Jan. 10, 1966
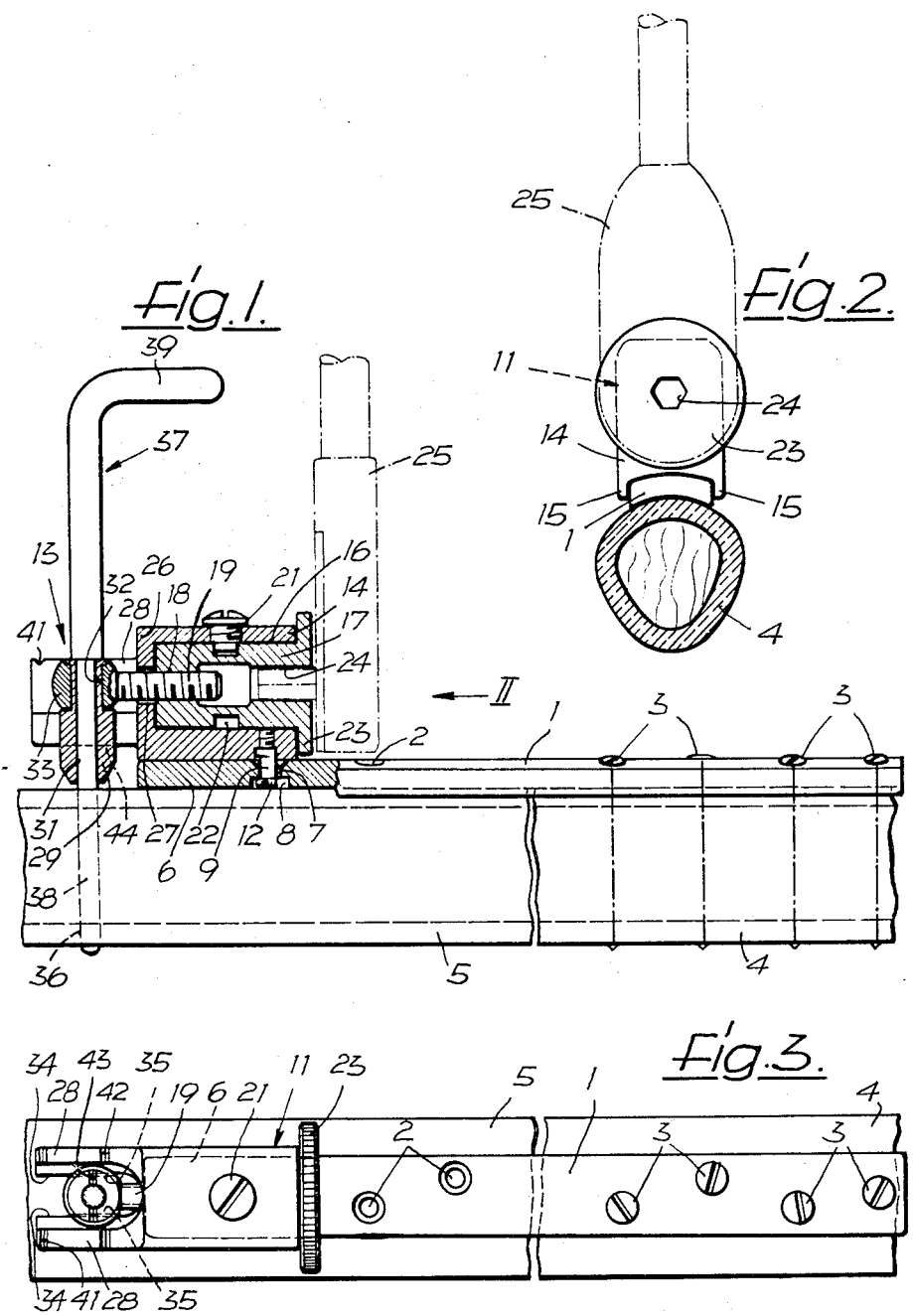
Inventors:
Hans Hux
Wilhelm Frick
By Ernest C Montague
Attorney

3,400,711
SURGICAL BONE PLATING APPLIANCE

Hans Hux and Wilhelm Frick, Tuttlingen, Baden, Wurttemberg, Germany, assignors to Aktiengesellschaft für Feinmechanik vormals Jetter & Scheerer, Tuttlingen, Germany, a corporation of Germany
Filed Jan. 10, 1966, Ser. No. 519,552
Claims priority, application Germany, Jan. 16, 1965, A 48,135
11 Claims. (Cl. 128—92)

The present invention relates to a surgical appliance for applying a traction upon the two parts of a bone which are separated by a fracture so as to draw these parts toward each other and thereby to impact the fracture ends and for then securing these two parts in a fixed position relative to each other by means of a coaptation or bone plate and a tensioning device, generally called a coaptor, which comprises a tension screw and a pair of tensioning elements which are connected by and movable in the axial direction of this screw and are adjustable thereby relative to each other. One of these tensioning elements which is to be connected to the bone plate and will hereafter be called the plate-clamping element is provided with a projection which is adapted to be inserted into a bore in the bone plate, while the other tensioning element, the bone-clamping element, is provided with an eye for connecting it to one part of the fracture bone.

The known appliances of this type are employed in such a manner that the bone plate is first screwed upon the first part of the bone at one side of the fracture, that a boring template is then connected thereto by inserting a projection thereof into a bore in the bone plate, and by means of this templtae a bore is drilled at a prescribed point into the second part of the bone at the other side of the fracture which is as yet not secured to the bone plate. By means of the tension screw which is inserted through the eye of the bone-clamping element and screwed into the bore which has been drilled into the second part of the fractured bone by means of the template, the bone-clamping element is then secured to this second part of the bone in a manner so that the projection on the plate-holding element will engage into the bore of the bone plate which has been provided for this purpose. The tension screw which connects the two clamping elements is then turned until they have drawn the two parts of the bone tightly together. When the fractured bone has thus been set, the bone plate is also screwed tightly upon the second bone part and thus connects the two parts rigidly to each other. Thereafter the tensioning coapter has to be unscrewed from the second bone part.

The above-mentioned appliance has the disadvantage that is requires a separate boring template for drilling a bore into one of the bone parts in order to permit the bone-clamping element to be screwed thereto. Furthermore, this bone-clamping element must also be screwed tightly upon one of the bone parts before the two parts are drawn toward each other, and subsequently it must again be unscrewed therefrom after the two bone parts have been properly set and fixed. This not only makes the surgeon's operation a very difficult procedure but it is also of great disadvantage to the patient since all of this work must be carried out on the living bone.

It is an object of the present invention to provide a surgical appliance of the type as described above which, however, consists of very few separate parts and which only requires very few and simple manipulations for drawing the two adjacent parts of a fractured bone together so as to insure a firm coaptation of the fracture ends and for securing the two bone parts in a fixed position relative to each other.

According to the present invention, this object may be attained by providing a plate-clamping unit which is adapted to embrace and grip the bone plate longitudinally on its opposite sides, and by providing a bone-clamping unit with an eye part in the form of a bushing which is used for connecting this unit to one of the bone parts.

This new type of construction has the considerable advantage that the connecting bushing of the bone-clamping unit may also be employed in a very simple manner as a boring template for drilling a bore into one of the bone parts. It is therefore an important feature of the invention that the new coaptor may be used for two purposes namely, for carrying out its main tensioning function and previously also as a boring template for drilling the bore into one of the bone parts so that a separate template is no longer required.

By the simple feature of designing the plate-clamping unit so as to embrace and grip the bone plate on both lateral sides, the advantage is attained that the coaptor may be adjusted so as to extend at all times exactly parallel to the longitudinal axis of the bone plate and thus to be fixed in the proper position for accomplishing its two functions as a boring template and as a tensioning device. The further feature of the invention as mentioned above which consists in providing the bone-clamping unit with a connecting bushing has the advantage that it permits this element to be very easily connected to one of the bone parts by means of a simple anchoring pin which is inserted into the bushing and into the bore in the bone part which has been previously drilled therein by employing the bushing as a boring template. Since the connecting bushing has a length so as to extend along a considerable part of the length of the anchoring pin, this pin will at all times be held at a certain angle, preferably of 90°, relative to the tension screw so that there is no longer any need for screwing the bone-clamping unit together with one of the bone parts in order to permit the two bone parts to be drawn together. When the bone plate has also been screwed tightly upon this bone part, it is only necessary to pull the anchoring pin out of the bore in this bone part and out of the connecting bushing in order to permit the coaptor to be removed from the bone plate. The entire manipulator of the device according to the invention is therefore extremely simple and may be carried out very quickly.

According to one preferred embodiment of the invention, the side of the plate-clamping unit which faces the bone plate and has a shape in accordance with the upper surface of the latter is provided with a pair of lateral jaws which are spaced from each other at a distance substantially in accordance with the width of the bone plate. In order to permit the plate-clamping unit to be quickly connected to and removed from the bone plate, the invention further provides the mentioned side of this unit near the end thereof which is most remote from the bone-clamping unit with a projection in the form of a screw with an eccentric head which may be inserted into a bore in the bone plate. The end of this bore facing the fractured bone is enlarged for receiving the eccentric head of the screw which may thus be quickly hooked over the shoulder between the bore and its enlarged end.

Another feature of the invention consists in designing the tension screw which is screwed into the plate-clamping unit so that its head carries the connecting bushing and is combined with the latter so that the two parts together form the bone-clamping unit. A bone-clamping unit of this construction may be made of a very simple construction by providing one end of the plate-clamping unit with a pair of axially projecting guide jaws which also extend parallel to the axis of the tension screw and are adapted to guide the connecting bushing, and by further providing one element of the plate-clamping unit in the form of a socket which has a cylindrical chamber into which a tubular nut is inserted which is rotatable therein but not movable in the axial direction. The tension screw is screwed into the threaded bore in one end of this nut, while the other end of the nut may be provided with a recess or aperture of a hexagonal or similar shape so as to permit the corresponding part of a socket wrench or similar tool to be inserted therein by means of which the nut may be very easily turned and thereby screwed along the tension screw so as to draw the two parts of the fractured bone toward and into tight engagement with each other. For turning the nut in one direction or the other, it is advisable to employ a reversible ratchet wrench.

These as well as other important features and advantages of the invention will become further apparent from the following detailed description thereof which is to be read with reference to the accompanying drawings, in which—

FIGURE 1 shows a side view, partly in cross section, of the appliance according to the invention while being secured to the two parts of a fractured bone for drawing them into engagement with each other;

FIGURE 2 shows an end view of the appliance according to FIGURE 1, as seen in the direction of the arrow II; while FIGURE 3 shows a top view of the appliance according to FIGURE 1.

As illustrated in the drawings, the surgical appliance according to the invention for drawing the two parts 4 and 5 of a fractured bone together so that the fracture ends will be impacted in coaptation with each other comprises a coaptation or bone plate 1 and a coaptor which consists of a plate-clamping unit, generally designated by the numeral 11, which is adapted to be secured to this bone plate 1, and of a bone-clamping unit, generally designated by the numeral 13. Bone plate 1 is provided with bores 2 for the insertion of screws 3 for securing it to the two bone parts 4 and 5. Bone plate 1 is further provided near its rear end 6 with a bore 7, the lower part 8 of which facing the bone part 5 has a larger diameter than its upper part for receiving the projecting head 12 of a screw 9 which is screwed tightly into the socket-shaped outer part 14 of the plate clamping unit 11. This head 12 is disposed eccentrically to the axis of screw 9 and is to be inserted into the larger part 8 of the bore and adapted to engage like a hook upon the shoulder between the smaller part 7 and the larger part 8 of the bore when the socket 14 is drawn toward the left of FIGURE 1 relative to the bone plate 1. The plate-clamping unit 11 may in this manner be very quickly secured to or removed from the bone plate 1.

As shown particularly in FIGURE 2, the lower side of the socket 14 facing the bone plate 1 is provided with a central curved surface in accordance with the shape of the upper surface of the bone plate, and with a pair of jaw-like projections 15 at both sides of this curved surface which extend along the entire length of the bone plate and are spaced from each other at a distance which is substantially equal to the width of the bone plate 1 so that, when the socket 14 is fitted over and hooked to the bone plate 1, it cannot be laterally shifted or turned relative to the bone plate.

Socket 14 has a cylindrical chamber 16 for receiving a tubular nut 17 which is rotatably mounted within this chamber and has a threaded bore 18 into which a tension screw 19 is screwed which forms a part of the bone-clamping unit 13 of the coaptor. In order to prevent any movement of nut 17 in the axial direction of the socket 14, the lateral wall of the latter is provided with a threaded bore into which a screw 21 is inserted which engages into an annular groove 22 in the outer peripheral surface of nut 17. The end of nut 17 which projects from the socket 14 is provided with an annular flange 23 which projects radially over the outer periphery of socket 14 and is knurled on its outside in order to permit the nut 17 to be more easily gripped and turned by hand. This end of nut 17 is further provided with an aperture 24, for example, of a hexagonal shape into which a suitable tool may be inserted for turning the nut 17 with the force which is necessary for drawing the two parts 4 and 5 of the fractured bone together and for forcing the fracture ends against each other. As indicated in FIGURES 1 and 2 in dot-and-dash lines, this tool preferably consists of a ratchet wrench 25 of a type known as such which is adjustable so as to permit its direction of effective action to be reversed for turning the nut 17 in one direction or the other.

The tension screw 19 which is screwed into the bore 18 of nut 17 passes loosely through the bottom 26 of socket 14 which is for this purpose provided with a bore of a diameter larger than that of screw 19. This bottom 26 of socket 14 has integrally thereon a pair of guide projections 28, the guide surfaces 34 of which extend parallel to the axis of tension screw 19 and are adapted to guide a bushing 29 which has an axial bore 31 extending vertically to the axis of tension screw 19. Bushing 29 is rigidly connected to tension screw 19 by being provided with a part 32 of a reduced diameter which is rigidly secured within a bore which extends transversely through a ball-shaped head 33 of screw 19. The part of bushing 29 which is located directly underneath this head 33 is provided with flat parallel guide surfaces 35 which are slidable along the guide surfaces 34 on the projection 28. Bore 31 of bushing 29 serves as a boring template for guiding a drill for accurately drilling a bore 36 into the bone part 5 into which the lower part 38 of an anchoring pin 37 is to be inserted. Bore 31 in bushing 29 also serves for receiving and guiding this lower part 38 of the anchoring pin 37 which may be passed through this bore 31 and into the bore 36 in the bone part 5 until the shoulder between the lower part 38 and the thicker upper part of pin 37 engages upon the upper side of the head 33 of the tension screw 19. The upper end of pin 37 is bent over at a right angle to facilitate its manipulation. For indicating the two outer end positions to which the bushing 29 may be moved, the upper sides of the guide projections 28 may be provided with markings 41 and 42 which may be brought into alignment with one or the other of the markings 43 on the head 33 of screw 18 by turning the nut 17 in one or the other direction.

For drawing the two bone parts 4 and 5 together and into tight engagement with each other and for then securing them in this position so as not to be movable relative to each other until the bone has healed, the bone plate 1 is first tightly screwed upon the bone part 4 by means of the screws 3. After then adjusting the nut 17 by turning the knurled flange 23 until the marking 43 is in alignment with the marking 41, the coaptors 11, 13 is placed in such a position upon the bone plate 1 that the projecting part of screw 9 will engage into the bore 7 and its eccentric head 12 into the enlarged part 8 of this bore. The coaptors 11, 13 will then be located in a clearly defined position on the bone plate. Thereafter the bore 36 is drilled into the bone part 5 by means of a drill, not shown, which is inserted into and guided by the bushing 29 which then serves as a boring template. The lower thinner part 38 of the anchoring pin 37 is then inserted into the two bores 31 and 36. By means of the ratchet wrench 25, the nut 17 may now be turned so as to draw the tension screw 19 into the socket 14 and thereby to draw the two bone parts 4 and 5 toward and against each other. Since the tension screw 19 is guided within the nut 17 and the bushing is guided between the guide projections 28, the anchoring pin 37 will always remain in its original position at right angles to the direction in which the tension is applied upon the two bone parts. This is also partly due to the fact that the flat outer guide surfaces 35 on bushing 29 are limited by projecting round parts on this bushing which are indicated by the dotted line 44 in FIGURE 1. As soon as the two bone parts 4 and 5 have been completely drawn together, the bone plate 1 is likewise connected to the bone part 5 by means of the screws 3. As soon as this has been done and the ratchet wrench 25 has been reversed, the nut 17 may be turned slightly in the opposite direction in order to relieve the pressure under which the anchoring pin 37 fits into the bore 36. The anchoring pin 37 may then be pulled out of the bores 31 and 36 and the coaptors 11, 13 may be removed from the bone plate 1. If necessary, an additional screw may then be screwed into the bore 7 in order to secure the two bone parts 4 and 5 as firmly to each other as possible.

The aperture 24 in nut 17 is illustrated in FIGURE 2 as being of a hexagonal shape, it may, of course, also be square or of any other suitable shape in accordance with the part of the wrench or other tool which is to be inserted therein. Instead of providing the nut 17 with the aperture 24, it is also possible to provide it with a projecting stud of a suitable shape on which a wrench may be applied.

While in FIGURE 1 it is assumed that the ratchet wrench 25 is of the reversible type, it is also possible to use one which is nonreversible but has a stud projecting from each of its opposite sides or which is provided with a continuous square or hexagonal bore in the event that the nut 17 is provided with a projecting stud. By applying one side or the other of such a ratchet wrench into or on the nut 17, the latter may then be turned in one direction or the other. The two sides of the wrench may then be marked, for exmaple, with the words "Tighten" and "Loosen" to indicate the proper side which is to be used.

Although this invention has been illustrated and described with reference to the preferred embodiment thereof, we wish to have it understood that it is in no way limited to the details of such embodiment but is capable of numerous modifications within the scope of the appended claims.

Having thus fully disclosed our invention, what we claim is:

1. A surgical appliance for drawing together at least a first and a second part of a fractured bone and for thereafter securing said bone parts rigidly to each other, comprising a bone plate, said bone plate having a longitudinal axis and comprising a first and a second part adapted to be applied upon the outside of said first and second bone parts, respectively, means for rigidly securing said first bone-plate part to said first bone part at one side of said fracture, a tensioning coaptor comprising plate-clamping means and bone-clamping means, said plate-clamping means comprising a member adapted to be connected to said second bone-plate part at the other side of said fracture and having means thereon for embracing and gripping said second bone-plate part at both lateral sides thereof, said bone-clamping means comprising a tension screw having an axis extending substantially parallel to said longitudinal axis of said bone plate and having one end screwed into said plate-clamping means, said tension screw and said plate-clamping means being adapted to be turned relative to each other about said axis of said tension screw so as to screw said plate-clamping means along said screw, a bushing secured to the other end of said tension screw and extending at an angle to the axis of said screw, securing means adapted to be secured to said second bone part and comprising a rod-shaped member adapted to be inserted through said bushing, said bushing being adapted to serve as a boring template for drilling a bore into said second bone part for receiving said rod-shaped member after it has been inserted through said bushing and for thus securing said rod-shaped member to said second bone part, and means for securing said second bone-plate part to said second bone part after said tension screw and said plate-clamping means have been turned relative to each other in one direction until said two bone parts are drawn together.

2. A surgical appliance as defined in claim 1, further comprising a pair of jawlike projections on said plate-clamping means extending parallel to the axis of said tension screw for guiding said bushing at the opposite sides thereof.

3. A surgical appliance as defined in claim 2, in which said bushing is provided with parallel outer guide surfaces and with projecting parts limiting said guide surfaces and adapted to engage with the surfaces of said jawlike projections.

4. A surgical appliance as defined in claim 1, in which said plate-clamping means further comprise a tubular nut, said member forming a socket having a cylindrical recess in one end thereof, said nut being mounted in said recess so as to be rotatable but not movable in the axial direction within said recess, said nut having a threaded bore extending in the axial direction in one end thereof, said tension screw extending loosely through a bore in the bottom of said socket and being screwed into said threaded bore.

5. A surgical appliance as defined in claim 4, in which the end of said nut opposite to the end into which the tension screw is screwed is provided with a knurled annular flange projecting axially and readily beyond the open end of said socket.

6. A surgical appliance as defined in claim 4, in which the end of said nut opposite to the end into which said tension screw is screwed is provided with means of a shape adapted to apply a tool thereon for turning said tension screw.

7. A surgical appliance as defined in claim 6 which includes said tool and in which said tool consists of a reversible ratchet wrench.

8. A surgical appliance as defined in claim 1, in which said embracing means on said member comprise a pair of lateral jaws projecting from one side of said member facing said bone plate and spaced from each other at a distance substantially equal to the width of said second part of said bone plate.

9. A surgical appliance as defined in claim 1, further comprising a connecting screw tightly screwed into one side of said member facing said bone plate and projecting from said side and having a head thereon, said second part of said bone plate having a bore adapted to receive the projecting part of said connecting screw, the end of said bore facing said second bone part being enlarged for receiving the head of said connecting screw.

10. A surgical appliance as defined in claim 1, further comprising a connecting screw tightly screwed into one side of said member facing said bone plate and projecting from said side and having a head thereon disposed eccentrically to the axis of said connecting screw so as to form a hook, said second part of said bone plate having a bore adapted to receive the projecting part of said connecting screw, the end of said bore facing said second bone part being enlarged for receiving said eccentric head and forming a shoulder between said bore and said enlarged end thereof, said head being adapted to be hooked over said shoulder when said member is shifted in the direction away from said fracture so as to secure said member to said bone plate.

11. A surgical appliance as defined in claim 1 in which said rod-shaped member forms an anchoring pin having one end adapted to be inserted through said bushing into a bore in said second bone part, the other end of said anchoring pin being bent over at an angle so as to serve as a handle to facilitate the manipulation of said pin.

References Cited

UNITED STATES PATENTS 1,101,954   6/1914   Petry _____ 128—85
3,244,170   4/1966   McElvenny _____ 128—92

OTHER REFERENCES

"Compression Plate Fixation and the Effect of Different Types of Internal Fixation on Fracture Healing," by Lewis D. Anderson, M.D., The Journal of Bones & Joint Surgery, vol. 47–A, No. 1, January 1965, p. 191, FIG. 1 relied upon. (Reproduced from Campbell's Operative Orthopaedics, Ed. 4, St. Louis, The C. V. Mosby Co., 1963.)

RICHARD A. GAUDET, *Primary Examiner.*

RONALD L. FRINKS, *Assistant Examiner.*